United States Patent Office 3,337,551
Patented Aug. 22, 1967

3,337,551
HETEROCYCLIC AMIDES OF 2,6-DIOXO-4-PIPERIDINEACETIC ACID
Herman E. Faith, Indianapolis, Ind., assignor to The Dow Chemical Company, Midland, Mich., a corporation of Delaware
No Drawing. Filed Jan. 8, 1965, Ser. No. 424,436
8 Claims. (Cl. 260—256.4)

This invention is directed to novel heterocyclic amides of 2,6-dioxo-4-piperidineacetic acid (also known as gluterimide-β-acetic acid).

The novel compounds of the invention are those in which the amido nitrogen attached to the acetyl function of a 2,6-dioxo-4-piperidineacetyl group is further attached to, or forms a part of, a nitrogen-containing five or six membered heterocyclic ring. These new compounds may be represented by the formula

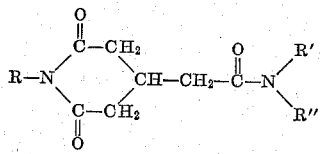

In this and succeeding formulae R represents hydrogen or lower alkyl, R' represents a nitrogen-containing heterocyclic ring, in which case R" repersents hydrogen, or the entire grouping

taken together forms a heterocyclic ring. Thus, R' alone may represent any of various monovalent heterocyclic radicals such as pyrimidinyl, pyridyl, piperidinyl, thiazolyl, thiazolinyl, N-alkyl-piperazinyl, pyridazinyl, imidazolyl, imidazolinyl, pyrrolyl, pyrrolidinyl, triazolyl, triazolinyl, benzothiazolyl, benzimidazolinyl and the like or such heterocyclic radicals bearing one or more neutral substituents such as halogen, nitro or lower alkyl groups. Similarly R', R" and the amido nitrogen taken together may form a heterocylic ring structure such as a piperazine, pyrrolidine or imidazoline ring. The novel compounds are crystalline solids, somewhat soluble in organic solvents such as lower aliphatic alcohols and dimethyl-formamide and of relatively low solubility in water. Certain of the compounds, wherein the heterocyclic ring or rings contain a basic nitrogen, form salts with mineral acids, such as hydrochloric acid, and the resulting acid-addition salts are somewhat more water-soluble than the corresponding free amides.

The new compounds are readily prepared by reacting 2,6-dioxo-4-piperidineacetyl chloride with a compound of the formula

The reaction is initiated readily when the reactants are contacted and proceeds with the splitting out of hydrogen chloride of reaction. The reaction may be accelerated by heating or controlled by cooling, as required, and is conveniently carried out in a suitable reaction solvent such as dioxane, pyridine, quinoline or the like. A mildly basic solvent such as pyridine or quinoline is desirable, since excess solvent may concurrently act as an acceptor of hydrogen chloride of reaction. On completion of the reaction the product may be worked up by conventional methods such as precipitation and recrystallization.

The following examples illustrate the invention but are not to be construed as limiting the same.

Example 1

11.8 grams (0.124 mole) of 2-aminopyrimidine was dissolved in 105 milliliters of dry pyridine. To the resulting solution 24.5 grams (0.13 mole) of 2,6-dioxo-4-piperidineacetyl chloride (gluterimide-β-acetyl chloride) was added portionwise over a 25-minute period and the mixture was stirred for 2 hours at a temperature of from 50° to 55° C. The mixture was then cooled and diluted with acetone to precipitate the amide product. The latter was recrystallized from aqueous 70 percent ethanol to obtain the N-(2-pyrimidinyl) - 2,6 - dioxo-4-piperidineacetamide product as a white, crystalline solid, melting at 187°–189° C.

Example 2

13.1 grams (0.131 mole) of N-methylpiperazine was dissolved in 110 milliliters of dry pyridine and reacted with 26 grams (0.138 mole) of 2,6-dioxo-4-piperidineacetyl chloride following the procedure of Example 1. Dilution of the cooled reaction mixture with acetone precipitated the product in the form of the hydrochloride salt. Recrystallized from 90 percent ethanol the 1-(2,6-dioxo-4-piperidineacetyl) - 4 - methylpiperazine hydrochloride product was a crystalline solid, melting at 273°–275° C.

Example 3

The procedure of Example 1 was followed to react 2,6-dioxo-4-piperidine-acetyl chloride in substantially equimolar proportions with each of the following:

(1) 2-aminopyridine
(2) 2-aminothiazole
(3) 3-amino-6-chloropyridazine
(4) 2-amino-5-nitrothiazole
(5) 2-amino-benzothiazole
(6) N-phenyl-piperazine to produce, respectively, the following products after recrystallization:

(1) N-(2-pyridyl)-2,6-dioxo - 4 - piperidineacetamide, a white crystalline solid melting at 226°–227.5° C.
(2) N - (2-thiazolyl)2,6-dioxo-4-piperidineacetamide, a slightly yellow, crystalline solid melting at 285°–287° C.
(3) N - (6-chloro-3-pyridazinyl)-2,6-dioxo-4-piperidineacetamide, an off-white crystalline solid melting at 285°–286° C.
(4) N - (5-nitro-2-thiazolyl)-2,6-dioxo-4-piperidineacetamide, a cream-colored crystalline solid melting at 274°–275° C. with decomposition.
(5) N-(2-benzothiazolyl)-2,6-dioxo - 4 - piperineacetamide, a white crystalline solid melting at 316°–317° C.
(6) 1 - (2,6-dioxo-4-piperidylacetyl)-4-phenyl-piperazine, an off-white crystalline solid melting at 191°–192° C.

In the case of product (6) no precipitate formed on addition of acetone to the reaction mixture. The mixture was thereupon concentrated by removal of solvents under vacuum and water was added to the residue to precipitate the desired product.

Example 4

Following the procedure of Example 2, substantially equimolar proportions of 2,6-dioxo-4-piperidineacetyl chloride and of 4-(1-pyrrolidinyl)-piperidine were heated in pyridine solutions and the resulting product precipitated as the hydrochloride salt and recrystallized to obtain the 1-(2,6-dioxo - 4 - piperidineacetyl)-4-(1-pyrrolidinyl)-piperidine hydrochloride product as a white, crystalline solid, melting at 230°–233° C.

In similar fashion, 4-aminopyridine was reacted with the acetyl chloride compound and the product precipitated as the hydrochloride salt. The latter was slurried with sodium bicarbonate solution to convert the product to the free base form to obtain the N-(4-pyridyl)-2,6-dioxo-4-piperidineacetamide product as a white crystalline solid, melting at 274°–276° C.

*Example 5*

40 grams of N-(2-thiazolyl)-2,6-dioxo-4-piperidine-acetamide (product (2) of Example 3) was dispersed in 500 milliliters of anhydrous acetone along with 80 grams of potassium carbonate. 47.2 grams of methyl iodide was added and the mixture was then heated at its boiling temperature and under reflux for 24 hours. The reaction mixture was then filtered while hot and the resulting filtrate cooled to cause crystallization of the desired N-methyl-N-(2-thiazolyl)-2,6-dioxo-1-methyl-4-piperidine - acetamide product. The latter was washed with ethanol and dried to obtain said product as a white crystalline solid, melting at 175° to 177° C.

*Example 6*

Following the procedure of Example 1, substantially equimolar proportions of 2-aminobenzimidazoline and 2,6-dioxo-4-piperidine-acetyl chloride were reacted in pyridine. Structure studies showed the product to be 1-(2,6-dioxo - 4 - piperidineacetyl) - 2 - iminobenzimidazoline, a white crystalline solid metling at 323°–325° C. with decomposition.

In similar fashion, 3-amino-1,2,4-triazole was reacted with 2,6-dioxo-4-piperidine-acetyl chloride to produce a derivative substituted on one of the ring nitrogens. In this case heating of said derivative at a temperature of 235° C. for about 8 minutes caused rearrangement of the acyl group to the exo-nitrogen to produce N-(s-triazol-3-yl)-2,6-dioxo-4-piperidineacetamide, a white solid melting at 286°–288° C.

Other compounds of the invention can be prepared in similar fashion to the above examples. Thus, the procedure of Example 5 can be carried out with others of the heterocyclic amides to prepare methylated derivatives thereof. Likewise, ethyl iodide can be substituted for methyl iodide in said example to produce the corresponding ethyl derivatives.

The compounds have been found useful as anticholinergic agents and transquilizers in laboratory animals at doses of from about 25 to about 200 milligrams per kilogram. The methylated derivative of the thiazolyl compound has proved particularly effective as a sedative.

I claim:
1. A compound having the formula

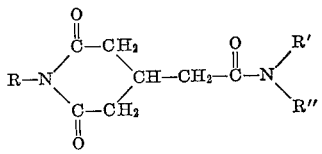

wherein R is selected from the group consisting of hydrogen and lower alkyl, R' represents (1) a monovalent heterocyclic radical obtained by removal of a hydrogen from a carbon atom in a heterocyclic ring and said radical is selected from pyrimidinyl, pyridyl, piperidinyl, (1-pyrrolidinyl)-piperidinyl, thiazolyl, nitrothiazolyl, thiazolinyl, N-lower alkyl-piperazinyl, N-phenyl-piperazinyl, pyridazinyl, chloropyridazinyl, imidazolyl, imidazolinyl, pyrrolyl, pyrrolidinyl, triazolyl, triazolinyl, benzothiazolyl, and benzimidazolinyl, in which case R'' represents hydrogen, and (2) R' and R'' taken together with the nitrogen in the grouping

form a heterocyclic ring selected from piperazine, pyrrolidine and imidazoline.

2. N-pyridyl-2,6-dioxo-4-piperidineacetamide.
3. N-(2-thiazolyl)-2,6-dioxo-4-piperidineacetamide.
4. N - (5 - nitro - 2 - thiazolyl) - 2,6 - dioxo - 4 - piperidineacetamide.
5. N - methyl - N - (2 - thiazolyl) - 2,6 - dioxo - 1-methyl-4-piperidine-acetamide.
6. 1 - (2,6 - dioxo - 4 - piperidineacetyl) - 2 - iminobenzimidazoline.
7. 1 - (2,6 - dioxo - 4 - piperidineacetyl) - 4 - methyl-piperazine hydrochloride.
8. N - (2 - pyrimidinyl) - 2,6 - dioxo - 4 - piperidine-acetamide.

No references cited.

ALEX MAZEL, *Primary Examiner.*

M. O'BRIEN, R. J. GALLAGHER, *Assistant Examiners.*